United States Patent

Burgess, Jr. et al.

[15] 3,654,650

[45] Apr. 11, 1972

[54] AUTOMATIC ASSEMBLY APPARATUS

[72] Inventors: Warren C. Burgess, Jr., Avon Lake; Donald N. Buckles, Fairview Park, both of Ohio

[73] Assignee: Burgess & Associates, Inc.

[22] Filed: July 6, 1970

[21] Appl. No.: 52,272

[52] U.S. Cl. .................................................... 10/155
[51] Int. Cl. ..................................................... B23p 19/08
[58] Field of Search ................... 10/155, 155 A, 169; 29/208, 29/211

[56] References Cited

UNITED STATES PATENTS

| | | | |
|---|---|---|---|
| 2,333,940 | 11/1943 | Kuehlman............................ | 10/155 A |
| 2,716,761 | 9/1955 | Nielson............................... | 10/155 A |
| 2,914,781 | 12/1959 | Prutton............................... | 10/155 A |
| 3,114,159 | 12/1963 | Yoshikawa........................... | 10/155 A |
| 3,226,744 | 1/1966 | Marechal et al. .................... | 10/155 A |
| 3,523,316 | 8/1970 | Alexander........................... | 10/155 A |
| 3,568,229 | 3/1971 | Moore et al.......................... | 10/155 A |

Primary Examiner—Charles W. Lanham
Assistant Examiner—E. M. Combs
Attorney—McNenny, Farrington, Pearne and Gordon

[57] ABSTRACT

There is provided an apparatus for the assembly of a male member such as a bolt blank and a female member, such as a washer, which apparatus is characterized by an element for supporting and moving the male member along a predetermined pathway. A guideway for the female member is provided which is coextensive with at least a portion of the pathway and which is adapted to change the relative spacial relationship of the female member to the male member in the predetermined pathway as the female member moves along the guideway. Means are provided for moving the female member along the guideway in synchronized relation with the male member whereby the male and female members are moved relative to one another in the pathway to a final assembled condition. In a specific embodiment, the predetermined pathway is circular, and the guideway for the female member is not only circular to correspond with the predetermined pathway, but also converges toward the supporting the moving means for the male member. In this manner the parts are assembled while in the pathway.

3 Claims, 5 Drawing Figures

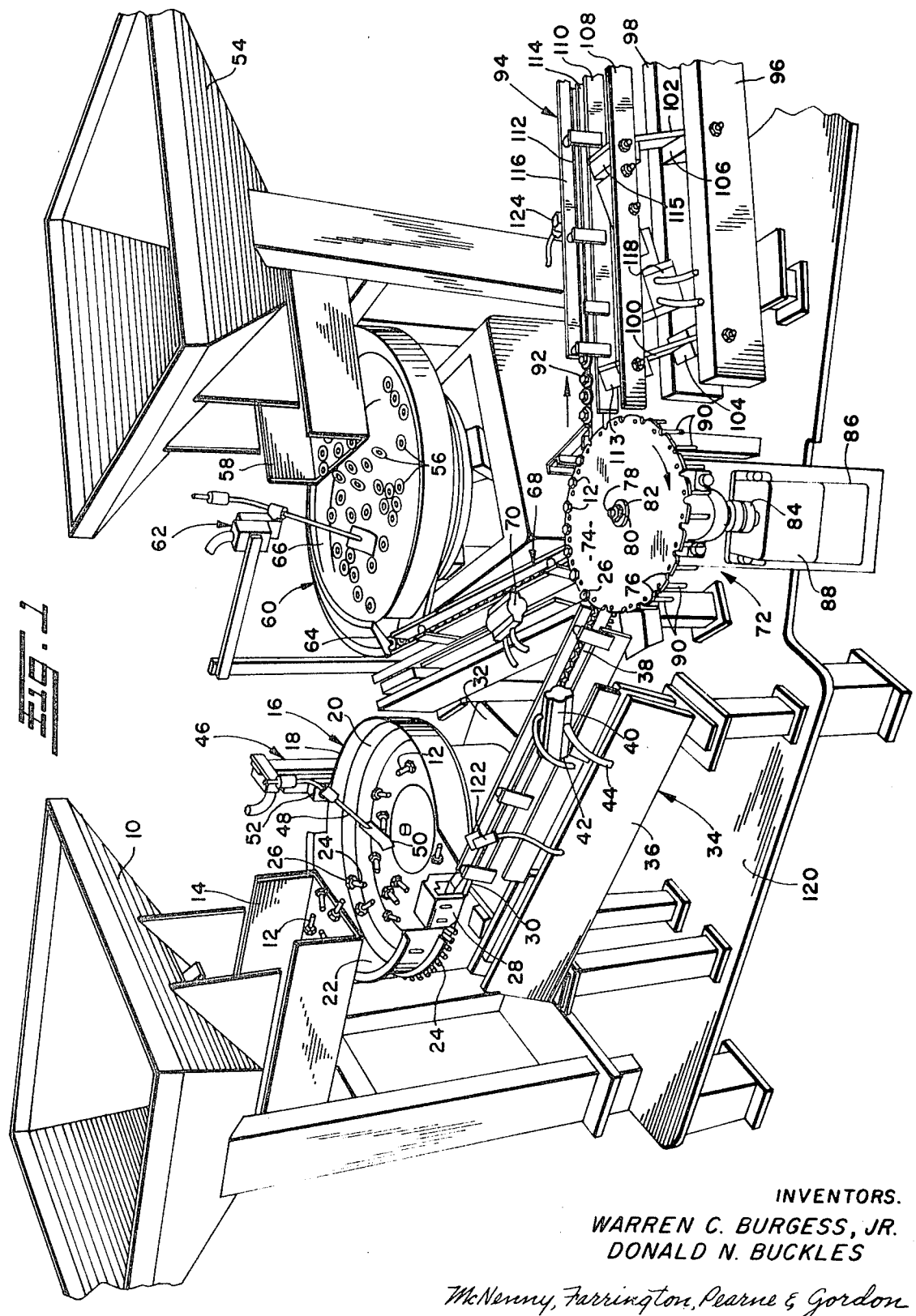

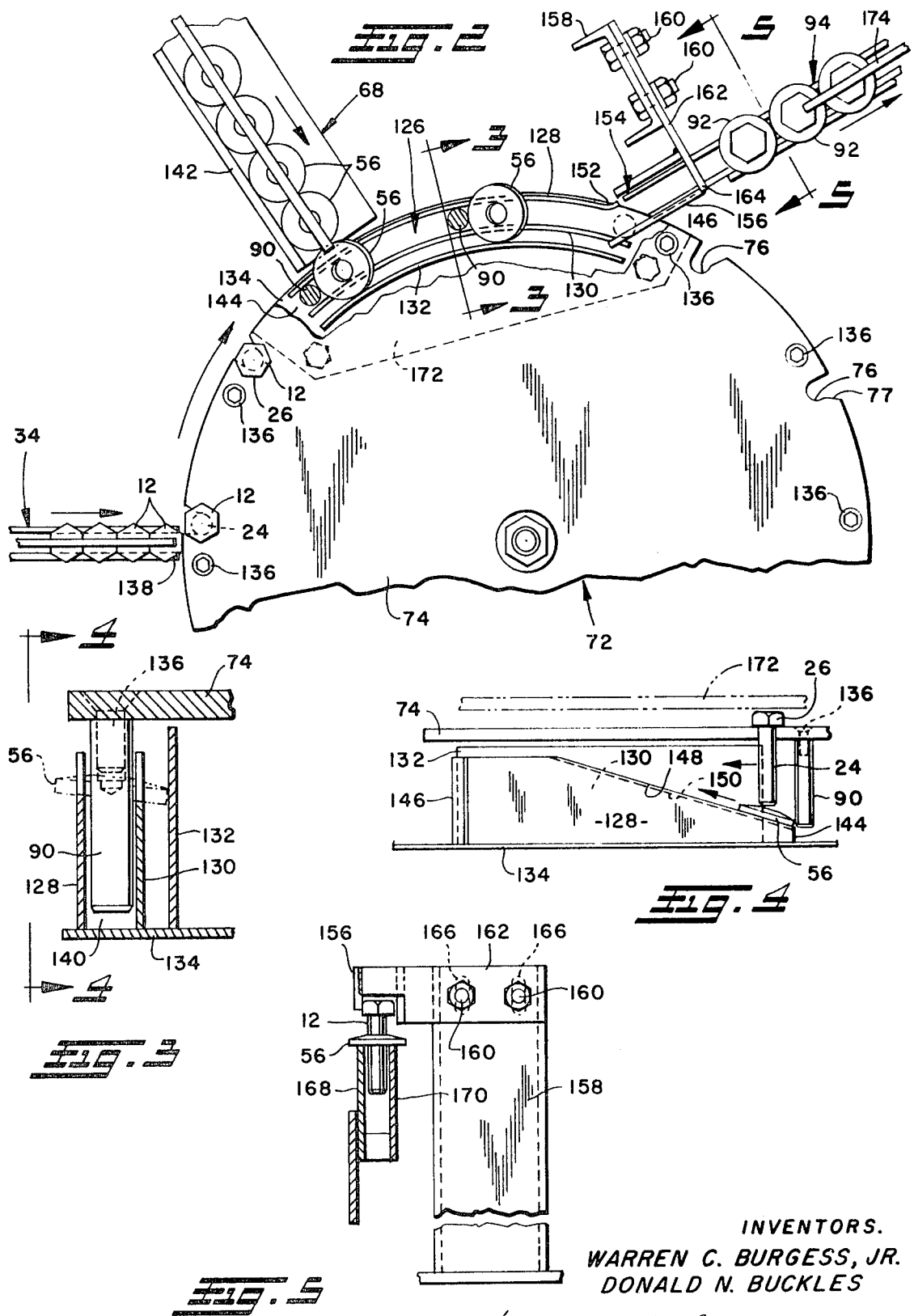

AUTOMATIC ASSEMBLY APPARATUS

BACKGROUND OF THE INVENTION AND PRIOR ART

The present invention relates to an apparatus for assembling male and female members in rapid succession. Recent advances in the field of automation and the speed with which certain operations may be performed have imposed demands for the supply of partially assembled elements or subassemblies. An example is the development of means for rapidly rolling threads upon bolt blanks. There is a heavy demand for bolts fitted with washers, particularly conical washers, wherein the threads have been rolled after assembly of the washer on the bolt blank. The effect of thread rolling on these subassemblies is to increase the diameter of the blank such that the washer is retained on the bolt and, in normal handling, will remain in assembled condition. Demand for such parts by certain equipment necessitates the provision of a machine which can produce subassemblies of this type at rates which may reach as high as 450–500 pieces per minute. Devices capable of producing assembled parts at these rates are presently unknown to the applicant.

BRIEF STATEMENT OF THE INVENTION

Briefly stated, the present invention is in the provision of an assembly device for assembling a male member such as a bolt blank and a female member such as a washer comprising in combination means for supporting and moving a male member along a predetermined path. In co-operating relationship therewith, there is provided a guideway for a female member which guideway is coextensive with at least a portion of the pathway and which is adapted to change the relative spacial relationship of the female member to the male member in the pathway as the female member moves along the guideway. Means are also provided for moving the female member along the guideway in synchronized relation to the male member whereby the male and female members are moved relative to one another in the pathway to an assembled condition. Thereafter, the parts in assembled condition may be conducted to such further operations as may be desired.

BRIEF DESCRIPTION OF THE DRAWINGS

The instant invention will be better understood with reference to the annexed drawings wherein:

FIG. 1 is an illustration in perspective of an embodiment of the present invention and showing the assembly device of the present invention in an environment wherein the male members, e.g. headed bolt blanks, are fed by vibratory means to the support means, and the female members to be assembled therewith, for example conical washers, are fed by a separate vibratory means to the guideway, not shown in FIG. 1, and assembled parts are removed for further processing.

FIG. 2 is a fragmentary plan view of a disk for supporting and moving hexagonally headed bolt blanks along a predetermined pathway, e.g. circular, the disk being partially cut away to show an inclined arcuate guideway for the female parts, and showing means for moving the female members along the guideway in synchronized relation to the male parts.

FIG. 3 is a fragmentary cross-sectional view on an enlarged scale showing the guideway as it appears in the plane indicated by the numerals 3—3 in FIG. 2.

FIG. 4 is a partial side elevation showing the means for supporting and moving the male member, the inclined guideway for the female member and the means coacting between the support for the male member and the guideway for moving the female member along the guideway in synchronized relation to the male member.

FIG. 5 is a cross-sectional view showing an assembled part on an exit transfer feeder as the apparatus appears in the plane indicated by the line 5—5 in FIG. 2.

DETAILED DESCRIPTION OF THE DRAWINGS

Referring now more particularly to FIG. 1, this illustration shows an environment in which the present invention is used. The machine illustrated produces at a high rate of speed a subassembly composed of a bolt blank and a conical washer in an oriented manner for feeding to a subsequent operation, such as thread rolling performed on a thread-rolling machine of current design. Such thread-rolling apparatus forms no part of the present invention and is, therefore, not described herein.

It will be understood that although the present invention is described with respect to assembling bolt blanks with conical washers, the present apparatus may be adapted for the assembly of other male and female parts, e.g. shafts and sleeves or bearing elements therefor. In general, the bolt blanks with heads thereon formed as for example by an upsetting operation are supplied to a hopper in random fashion from a bulk supply thereof. The hopper in turn feeds these parts to a bowl-type parts feeder desirably although not essentially, in accordance with controls responsive to demand. The bowl-type parts feeder is capable of orienting the blanks and delivering them to a transfer feeder capable of presenting a succession thereof to the assembly device of the present invention. Likewise, the female parts are fed by means of a hopper from a random supply to a second bowl-type parts feeder capable of orienting the female parts in a predetermined manner and delivering them to a transfer feeder also capable of presenting a succession of these parts in oriented manner to the assembly apparatus of the present invention. After the parts have been assembled, they are picked up from the assembly apparatus and moved by means of another transfer feeder handling the assemblies for delivery to subsequent operations.

According, there is provided as shown in the illustration of FIG. 1 a hopper 10 which is adapted to contain unthreaded, heated bolt blanks 12. Underlying the hopper 10 there is provided a vibratory trough 14 capable of delivering the bolt blanks 12 to a bowl-type parts feeder apparatus generally indicated at 16. A bowl-type feeder which is particularly useful in accordance with the present invention is as described in copending application Ser. No. 804,477 filed Mar. 5, 1969 now U.S. Pat. No. 3,578,142. Generally speaking, a preferred apparatus for orienting and delivering oriented headed parts includes a vibratable bowl 18 adapted to impart motion along a predetermined axially progressing spiral pathway 20. There is provided an adjacent upstanding wall portion 22 spaced from the track in an axial direction to define a slot which is preferably adjustable in width, which slot allows escapement of the shank portions 24 of the headed bolt blanks 12 and at the same time ensures retention of the head portion 26 thereof. Discharge means generally indicated at 28 are provided which include a rail portion 30 for guiding and supporting coaction with the bolt blanks.

As described in the aforesaid application Ser. No. 804,477, now U.S. Pat. No. 3,578,142, the vibratory bowl 18 is conveniently mounted upon a plurality of inclined flat springs (not shown in FIG. 1) which support the bowl in spaced relation to a massive base 32. The springs are conveniently of the flat leaf spring type, for example as may be formed from glass fiber reinforced epoxy resin. These springs are conventional. Normally four such springs are secured by mounting blocks to each of the bottom of the bowl 18 and the base 32 in circumferentially spaced relation about a central axis. These springs serve in a particular manner with a pneumatic free-piston vibration-inducing device such as that disclosed in FIG. 2 of U.S. Pat. No. 2,985,280. The vibratory drive means may be mounted vertically on the aforesaid central axis so that the free piston oscillates along the axis, or the vibratory drive means may be mounted on a laterally extending side arm so that the free piston oscillates in a plane which is transverse to the aforesaid central axis. For example, reference may be had to U.S. Pat. No. 3,367,480 wherein such a side arm drive is fully disclosed. With such a free-piston pneumatic vibration-inducing device, the springs of the preferred vibratory bowl-type feeder generally indicated at 16 function as a fully responsive system which stores and releases energy, and guides the bowl as it oscillates along an inclined curved pathway.

As indicated above, this apparatus is capable of feeding the bolt blanks in oriented fashion to a vibratory transfer feeder generally indicated at 34. The vibratory transfer feeder 34 includes a base 36 in which flat springs, not shown, are mounted for supporting a pair of parallel rails such as rail 38. Reference may be had to U.S. Pat. No. 3,216,556 which shows one form of a vibratory transfer feeder which may be adapted for use in conjunction with the assembly machine shown in FIG. 1. The vibratory impulses are imparted by a pneumatic vibration-inducing device 40 to which a pressurized gas inlet line 42 and an exhaust line 44 are conveniently attached. In order to control the level of bolt blanks in the bowl-type parts feeder 16, there is conveniently provided a control apparatus generally indicated at 46 including a feeler arm 48 and a feeler paddle 50. The arm 48 is conveniently associated with electrical or pneumatic control means such as control element 52 which is sensitive to movement of the paddle 50 and the arm 48. If the quantity of bolt blanks 12 in the bowl 18 is too low, then the vibratory trough 14 is activated so as to deliver more parts to the central portion of the bowl 18. Conversely, if the quantity of parts is too high, as for example may be caused when bolt blanks cease to be accepted by the assembly apparatus, then elevation of the paddle 50 will result in the vibratory trough 14 terminating its feeding action, thereby cutting off the supply of blanks 12 from the hopper 10 to the bowl 18.

In like manner, there is provided a second hopper 54 adapted to contain a random supply of female members, e.g. conical washers 56. A vibratory trough 58 also driven by pneumatic vibratory means, not shown, serves to supply a second bowl type feeder apparatus generally indicated at 60 with a supply of parts. In like manner, a parts level control apparatus generally indicated at 62 and functioning in the same manner as control apparatus 46 regulates the supply of female members to the bowl-type parts feeder 60.

The bowl-type parts feeder 60 is basically the same type of apparatus as the bowl-type parts feeder 16 but contains different tooling to effect an orientation of the conical washers so that all of the parts exiting from the discharge extremity 64 of the bowl 66 have the same attitude. The oriented female parts are in like manner delivered to a second transfer feeder generally indicated at 68 for moving a supply of oriented female members to the assembly apparatus of the present invention. Again, while the mode of mounting and operating the transfer feeder 68 is essentially the same as that for the transfer feeder 34, the tooling along the vibrating trackway will be such as to accommodate the particular female part, e.g. washers. As in the case of the transfer feeder 34, oscillatory motion is imparted thereto by means of a pneumatic free-piston vibration-inducing device 70.

The assembly device embodying the present invention is generally indicated in FIG. 1 by the numeral 72. The assembly device 72 is characterized by a disk 74 which serves to support and move the headed parts 12 received from the transfer feeder 34 along a predetermined arcuate pathway. The disk 74 is provided with a plurality of peripheral notches 76 which are dimensioned to receive the shanks of the headed parts 12, but insufficiently sized to allow the heads 26 to fall therethrough. The disk 74 is mounted on a shaft 78 by any suitable means such as nut 80 and washer 82 and coupled as by coupler 84 to any suitable motor means 86. In the embodiment illustrated in FIG. 1, the motor means is conveniently an electric motor operating through a gear reduction box 88. This apparatus imparts a clockwise motion to the disk 74 and causes movement of the male members along the predetermined arcuate pathway. Depending from the disk 74 is a plurality of pins, e.g. pins 90. The pins 90 coact between the disk and the guideway for the female members, hereinafter more particularly described, to move the female members along the guideway in synchronized relation with the male members carried in the notches 76. The subassemblies 92 exit from the assembling apparatus 72 and enter a third transfer feeder generally indicated at 94. The transfer feeder 94 is of similar construction and operation to transfer feeders 34 and 68 and is composed of massive base members 96 and 98 and a plurality of inclined leaf-type springs such as inclined springs 100 and 102. Such springs are suitably secured to the base members 96 and 98 by mounting blocks such as blocks 104 and 106, and to the rail supporting beams 108 and 110 by mounting blocks 113 and 115. A pair of spaced parallel rails 112 and 114 serve to support and guide the subassemblies 92. A retaining rail 116 may be supplied to prevent the subassemblies 92 from climbing out of the trackway formed by the parallel rails 112 and 114. A pneumatic free-piston vibration-inducing device 118 is provided to impart oscillatory motion to the rails 112 and 114 to cause movement of the subassemblies 92 therealong. The foregoing components are all suitably mounted on a base 120 to provide a unitary piece of equipment readily adapted for coaction with other machinery capable of performing additional operations on the subassemblies 92.

Also shown in relatively diagrammatic form in FIG. 1 are control means such as control 122 which is adapted to sense by pneumatic means to continuity of flow or oriented bolt blanks 12 along the trackway of transfer feeder 34. If there is a break in the line of parts, such a device can effect shut-down of the balance of the equipment. In like manner, a control 124 may sense a break in the line of subassemblies 92 signaling trouble and effecting a shut-down of the machinery. Numerous types of controls and sensors responsive to the feeding or lack thereof may be associated with the machinery as the demands of a particular situation may require.

Referring now more particularly to FIGS. 2, 3 and 4, there is shown in partial plan view and on an enlarged scale relative to FIG. 1 a supporting and moving disk for supporting and moving the headed bolt blanks 12 through or along a predetermined pathway. In the embodiment shown in the annexed drawings, the predetermined pathway may be regarded as the arcuate surface generated by the longitudinal axis of the bolt blanks 12 when in position in the peripheral notches 76 circumferentially equally spaced about the periphery of the disk 74. In the embodiment shown, the length of the arc of the predetermined pathway is less than 135°. The extent of the arc is relatively unimportant and, in the embodiment shown, is that portion of the circle which is sufficient to effect assembly of the female part with respect to the male part and the slope of the guideway hereinafter more particularly described. Any suitable means for supporting and moving the male member along a predetermined pathway may be employed. For example, instead of the more convenient disk form, there may be used a chain structure movable about spaced sprockets. In this case, the predetermined pathway may be straight or partially curved and partially striaght. Still further, the spacial disposition of the predetermined pathway need not be the preferred form wherein the elements of the pathway as generated are vertical; they may also be horizontal or at any convenient angular deposition between vertical and horizontal. In any event, the pathway through which the male members pass is that surface which would be generated by the axes of the male members as they move in response to movement of the holding or transporting means, be those means a chain, a disk or other supporting device.

The notches 76 are conveniently, although not essentially provided with a raked edge 77 to facilitate removal of assemblies from the disk 74.

Also in circumferentially spaced relation about the periphery of the disk 74 there is provided a plurality of depending pins or fingers 90. The fingers are preferably although not essentially disposed in a direction parallel to the axis of the disk normal to the plane of the disk. They may, however, be canted at an angle relative to the plane of the disk. These figures are spaced relative to the notches 76 such that the fingers engage a female member in position on the guideway hereinafter described. The fingers 90 transmit the rotary movement of the disk 74 to the female parts in a sequential manner and at the same time synchronize the location of the female part relative to the male part so that assembly can be effected at a later point within a predetermined pathway.

As indicated above, there is provided a guideway generally indicated at 126 for the female parts. The guideway is composed of a pair of spaced arcuate rails 128 and 130. A stop plate 132 is also conveniently provided as a backstop against which the female parts 56 rest as they traverse the guideway 126. As shown in FIG. 3, the rails 128 and 130, and the stop plate 132, extend upwardly from a base plate 134. The stop plate 132 has the same arcuate configuration as the rails 130 and 128, all of such parts 128, 130 and 132 being in concentric relation in the embodiment illustrated in the annexed drawings.

As best shown in FIGS. 3 and 4, the rails 128 and 130 forming the guideway 126 are preferably slightly unequally dimensioned, the inner rail 130 being slightly less tall than the outer rail 128. This structure disposes the female member 56 in a slightly downwardly and inwardly sloped condition which improves the stability of the female part as it moves along the guideway 126. The location of the stop plate 132 relative to the rails 128 and 130 is such as to dispose the axis of the aperture of the conical washers 56 in the surface of the predetermined pathway as generated by the longitudinal axes of the male members 12. The location of the stop plate 132 will, of course, depend upon the desired location of the aperture of the female member to be fitted over the shaft of the male member and constitutes an element of the means for synchronous relationship of the female member to the male member as they move along the predetermined pathway.

Another element of the means for moving the female member in synchronized relation to the male member is, of course, the depending pins 90. As best shown in FIG. 3, the depending pins 90 are conveniently fastened to the disk 74 by means of the flat head machine screws 136.

As shown in FIG. 2, the discharge extremity 138 of the transfer feeder 34 is disposed in such a way that the male members 12 under the influence of the vibratory impulses of vibration-inducing device 40 are readily accepted by the disk 74 in the slots 76 as they present themselves at the discharge extremity of transfer feeder 34 during rotation of the disk 74. The base plate 134 is stationary and movement of the female parts on the guideway 126 is effected by the pins 90 which are of sufficient length to extend well into the recess 140 defined by the upstanding rail members 128 and 130. The vibratory feeding motion of the transfer feeder 68 imparted by the vibration-inducing device 70 assures a continuing supply of female members at the discharge extremity 142 of transfer feeder 68. As a given female member 56 is moved in the predetermined pathway by a pin 90, a succeeding female member 56 is urged into position against the stop plate 132 by the vibratory motion of the transfer feeder 68 there to await the succeeding synchronizing and moving pin 90. The tooling of the guideway 126 and the elevation of the discharge extremity 142 of the transfer feeder 68 is such that the female members enter the guideway without interference from the male members at the point of entry thereon. Stated in another way, the length of the male members is insufficient to intercept the female members as they enter the predetermined pathway from the discharge extremity 142.

Assembly of the female members 56 and the male members 12 is effected intermediate the female member inlet extremities 144 and the exit extremity 146 of the guideway 126. As shown in FIG. 4, the upper marginal edges 148 and 150 of rails 128 and 130, respectively, are sloped upwardly and arcuately from the inlet extremity 144 toward the outlet extremity 146. At the outlet extremity, the outer rail member 128 is conveniently flared radially outwardly to provide a curved exit 152 leading to the inlet extremity generally indicated at 154 of transfer feeder 94. In order to divert the assembled parts out of the predetermined pathway described by the male members as they move through the guideway 126, there is provided a baffle member 156 disposed in intercepting relation with the parts as they move into the exit extremity 146 of the guideway 126. Suitable bracket means include a support member 158 to which a laterally projecting arm 162 is fastened by suitable means including bolts 160. The baffle 156 is secured as by welding to the distal extremity 164 of arm 162. Vertical adjustment of the arm 162 and its associated baffle 156 is permitted by means of elongated slots 166 with which the fastening means including bolts 160 co-operate.

As shown in FIG. 5, the assembled parts 56 and 12 are supported between transfer feeder rails 168 and 170 and moved by vibratory means away from the assembling apparatus 72. In order to prevent male parts 12 from being dislodged from the holding disk 74 by any slight misalignment with respect to the female parts, there may be provided a slide plate or hold-down 172 overlying the head portions 26 of the male members 12. In like manner, in order to prevent dislodgement of the assembled parts 92 from the exit transfer feeder 94, there may be provided a hold-down beam 174. These hold-down means offer no resistance to movement of the parts except to prevent their dislodgement from the respective conveying members.

OPERATION OF THE MACHINE

Assembly of male members and female members in the embodiment shown in the annexed drawings is effected by initiating rotation of the disk 74 about its vertical axis with suitable drive means. Headed bolt blanks 12 aligned by means of a vibratory bowl feeder and discharged from the extremity of a straight line transfer feeder 34 are brought into juxtaposition with the periphery of the rotating disk 74. As a slot 76 moves into a part-receiving position under the influence of the vibratory urging of the transfer feeder 34, one male member accepts a position in the supporting and moving disk 74. As it proceeds along its predetermined pathway followed by a follower pin 90, it passes between the rails of the guideway 126. Female parts have been deposited again by vibratory means and in oriented fashion at the lower extremity of an inclined arcuate guideway. Follower pins 90 are dimensioned to fit between the rails 128 and 130 defining the guideway 126 and are spaced relative to the male member 12 so that the lower extremity of the pin 90 engages the female member and moves it in synchronized relation with the male member along the guideway against the stop plate 132. As the guideway elevates along its sloped portion, the female member 56 is urged upwardly and into assembled relation with the depending male member.

Misalignment of these parts will not effect dislodgement of the male member because of the downwardly urging effect of a plate such as hold-down 172. The parts then in assembled relation continue movement along the predetermined arcuate pathway to a discharge extremity 146 where they are diverted by a baffle 156 intercepting the predetermined pathway and conducting the assembled parts 92 onto a discharge transfer feeder 94. Parts are thus assembled in rapid sequential order and as indicated above feed rates on the order of 450 – 500 parts per minute have been achieved.

There has thus been provided an improved high speed assembling apparatus and a machine for assembling male and female parts from separate random supplies thereof and presenting them in assembled, oriented fashion for further operation such as thread rolling.

We claim:

1. An assembly device for assembling a male member and a female member comprising in combination:
 a. means for supporting and moving a male member along a predetermined pathway including a horizontally disposed disk having a plurality of circumferentially equally spaced male member-receiving and holding notches located about the periphery thereof and drive means for rotating said disk about a vertical axis, said predetermined pathway having the configuration of an arc of a circle;

b. a guideway for a female member coextensive with at least a portion of said pathway and adapted to change the relative spatial relationship of the female member to the male member in said pathway as the female member moves along said guideway, said guideway including an outer rail and an inner rail each following the arcs of circles concentric with said predetermined pathway, the outer rail being formed on an arc of larger diameter than the arc of said predetermined pathway, and the inner rail being formed on an arc of smaller diameter than the arc of said predetermined pathway, said outer and inner rails converging upon the plane of said disk between a remote inlet extremity of said guideway and a proximal exit extremity thereof; and c. means for moving said female along said guideway in synchronized relation to said male member whereby said male and female members are moved relative to one another in said pathway to assembled condition, including a plurality of fingers depending from said disk alternately with said peripheral notches and dimensioned to project between the inner and outer rails of said guideway to intercept sequentially female members on said guideway adjacent the remote inlet extremity thereof, the female member-engaging portion of each finger being located relative to a corresponding peripheral notch that the relationship of respective male and female parts is synchronized in said predetermined pathway for relative movement to an assembled condition.

2. An assembly device in accordance with claim 1 wherein the guideway also includes a concentrically configured and located stop plate for stabilizing and locating the female parts on said inner and outer rails.

3. An assembly device in accordance with claim 1 which includes:

d. a vibratory transfer feeder for presenting a succession of oriented male members for acceptance in successive peripheral notches in said disk;

e. a vibratory transfer feeder for presenting a succession of oriented female members for acceptance at the inlet extremity of said guideway;

f. a vibratory transfer feeder for accepting and transmitting a succession of assembled male and female members from the exit extremity of said guideway; and g. means adjacent the extremity of said guideway for intercepting assembled parts and diverting them from said predetermined pathway to the last-mentioned vibratory transfer feeder.

* * * * *

UNITED STATES PATENT OFFICE
CERTIFICATE OF CORRECTION

Patent No. 3,654,650          Dated April 11, 1972

Inventor(s) Warren C. Burgess, Jr., and Donald N. Buckles

It is certified that error appears in the above-identified patent and that said Letters Patent are hereby corrected as shown below:

Column 4, Line 24, the line should read -- by pneumatic means the continuity of flow of oriented bolt --.

Column 4, Line 74, "figures" should read -- fingers --.

Column 7, first line of (c) (Line 15), after female -- member -- should be inserted.

Signed and sealed this 5th day of September 1972.

(SEAL)
Attest:

EDWARD M. FLETCHER, JR.                ROBERT GOTTSCHALK
Attesting Officer                      Commissioner of Patents